United States Patent [19]
Kephart

[11] Patent Number: 5,341,184
[45] Date of Patent: Aug. 23, 1994

[54] COMPARATIVE PHOTOGRAPHIC DOCUMENTATION APPARATUS

[76] Inventor: Richard E. Kephart, 7407 Topanga Canyon Blvd., Canoga Park, Calif. 91303

[21] Appl. No.: 997,551

[22] Filed: Dec. 28, 1992

[51] Int. Cl.$^5$ ............................................. G03B 29/00
[52] U.S. Cl. ........................................ 345/62; 354/81
[58] Field of Search .................. 354/62, 81, 126, 132, 354/195.1, 290, 293, 294

[56] References Cited

U.S. PATENT DOCUMENTS

| | | | |
|---|---|---|---|
| 2,290,793 | 3/1940 | Alderman | 354/62 X |
| 4,394,074 | 7/1983 | McMahon et al. | 354/62 X |

Primary Examiner—Blankenship Howard B.
Attorney, Agent, or Firm—Roger A. Marrs

[57] ABSTRACT

Apparatus includes a mobile stand supporting a photographic assembly having a camera photographing through a light at pre-set and fixed apparatus-to-patient distance establishing a constant photographic environment, in minimal space. The photographic assembly includes a means to mount a 90 degree rotatable camera body about an axis perpendicular to the film plane whereby subjects can be photographed on either a horizontal or vertical format. An adaptor sleeve is mounted on a zoom lens and, in conjunction with a motor and friction drive mechanism, move the zoom lens coaxial with the optical axis to compensate for and to bring, varying weight/mass differences between patients, into uniform image size. A mobile stand mounts the assembly between upright stanchions to compensate for varying height differences between patients into uniform image size. The assembly includes a lens hood, a set of two light elements mounted to effect a reflective "bounce-light" radiation focused to project "wrap-around" lighting onto the subject in conjunction with the fixed parameters of the previously mentioned photographic environment.

9 Claims, 2 Drawing Sheets

COMPARATIVE PHOTOGRAPHIC DOCUMENTATION APPARATUS

BACKGROUND OF THE INVENTION

1. Field of the Invention

The present invention relates to the field of photographic documentation for medical, and non-medical, purposes and, more particularly, to a comparative photographic apparatus which establishes a controlled and repeatable photographic environment yet, is movable, and includes improved lighting, means for selective image sizing, means of subject posing orientation and ease of use.

2. Brief Description of the Prior Art

Currently, in the field of medicine, and related non-medical fields, there is a constant need for sophisticated apparatus to permit precision documentation and recordation of a patient's appearance prior to surgery and, to again, repeat precision documentation and recordation of a patient's appearance after surgery under the same conditions so that the effect, only, of the surgeon's effort can be measured. As a practical matter, since that which is significant is the appearance of the subject/patient after procedure, photography is the usual means of documentation. Quality images are required now, more than ever before, for medico-legal, insurance reimbursement, surgical planning and continuing education support for lectures, articles and the like.

Problems and difficulties have been encountered with conventional photographic apparatus in that such apparatus adapts and adjusts to variables and, therefore is not systematic, or standardized, and defeats unbiased documentation gathering. Space allotment required for sophisticated photographic documentation procedures is, also, a limiting factor (Such a prior device is disclosed in U.S. Pat. No. 4,236,795.). In all prior cases, a working knowledge of photography is required.

Therefore, a long-standing need has existed to provide an improved comparative photographic apparatus which includes improved lighting radiation characteristics, ease of use, improved mechanisms to establish uniformity and repeatability of documentation events and mobility for non-commitment of dedicated, valuable space and for storage when not in use.

SUMMARY OF THE INVENTION

Accordingly, the above problems and difficulties are obviated by the present invention which provides a novel pre and post-operative photo apparatus which includes a movable stand on which a pair of stanchions are carried that support a combined camera and lighting assembly. The camera and lighting assembly include a camera with a zoom lens device which is mounted behind a rotational panel carried on the stanchions. An outwardly projecting adaptor sleeve is movable on a light panel through which the zoom lens of the camera projects and moves along an optical axis in response to a controlled motorized drive means via a frictional drive mechanism. The motor means is disposed between a forward lens hood carried on the light panel and a reflector shield also carried on the light panel whereby the reflector shield and the lens hood are in fixed spaced-apart relationship. The space defined between the lens hood and the reflector shield is partially occupied by a set of strobe lights so that the lens hood interferes with direct radiation of the light towards the photographic subject while the radiation is reflected from the shield outwardly toward the photographic subject. Control means for rotating the camera panel as well as for operating the motor for zoom lens actuation and the shutter mechanism are conveniently located behind the light panel.

Therefore, a primary object of the present invention is to provide a novel pre and post-operative photo apparatus having improved lighting and pre-focusing means so that the photographic end results are greatly enhanced and improved.

Another object of the present invention is to provide a novel photographic recordation device that may be readily moved to multiple locations or stored out of the way when not in use.

Another object of the present invention is to provide a novel medical photo recording and documentation apparatus which includes a rotary mounted camera having a zoom lens carried on a mobile stand and which further includes a strobe lighting means carried on a light reflector shield immediately behind a lens hood so that improved lighting characteristics are provided.

Yet another object of the present invention is to provide a novel photo documentation apparatus which can capture repeatability of patient viewing angles by employing improved lighting and camera positioning means in a unitary construction.

A further object resides in providing a comparative photographic apparatus which provides for a controlled and repeatable photographic environment and one which is mobile provided with improved ease of use in connection with subject posing orientation and selective image sizing.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
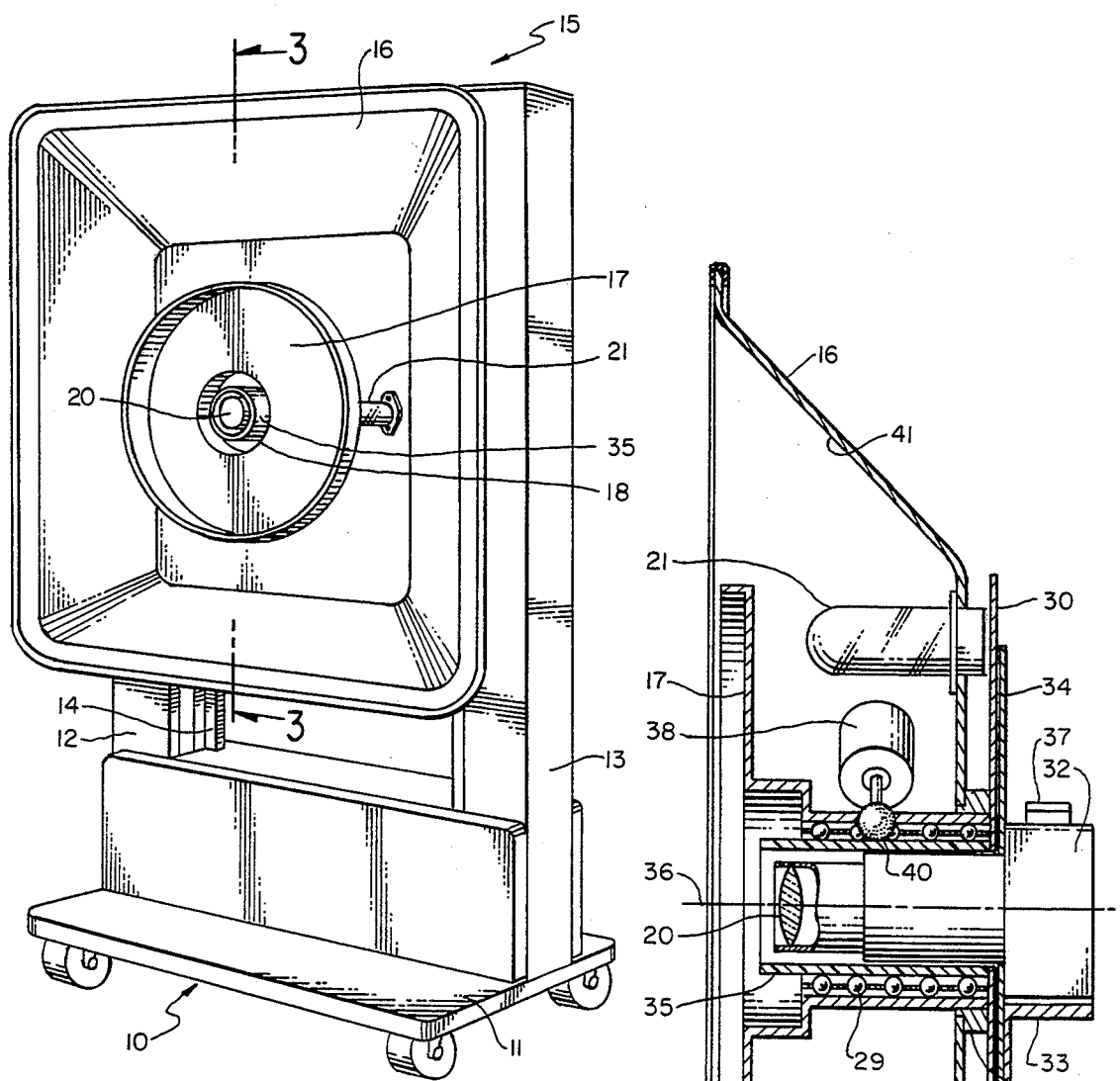
FIG. 1 is a front perspective view showing the novel photographic apparatus incorporating the present invention.

Referring to FIG. 1, the novel photo recordation or documentation apparatus of the present invention is indicated in the general direction of arrow 10, which includes a wheeled platform 11 intended to rest directly on a floor surface so that it may be moved about at the selection and discretion of the technician operating the device. The platform includes parallel upright stanchions 12 and 13 which are fixed to the platform 11 and which are arranged in fixed spaced-apart relationship. The opposing surfaces of the stanchions 12 and 13 are provided with a track means, such as indicated by numeral 14, which movably supports a camera and light assembly so that the assembly can be moved in a vertical direction for height adjustment. The camera and lighting assembly is indicated by the arrow 15 which includes a light reflector 16 fixedly held about a lens hood 17 which, in turn, includes an opening 18 through which a lens assembly 20 projects from the body of a camera mounted behind the assembly 15. Carried on the reflector shield 16 and immediately behind the lens hood 17, there is provided a set of strobe lights, such as light 21, which emits light radiation against the back side of the lens hood 17 which is redirected outwardly in a radiating manner to impinge against the angular surfaces of the reflector shield 16 for distribution forward of the apparatus 10 onto the subject being photographed.

Figure 2:
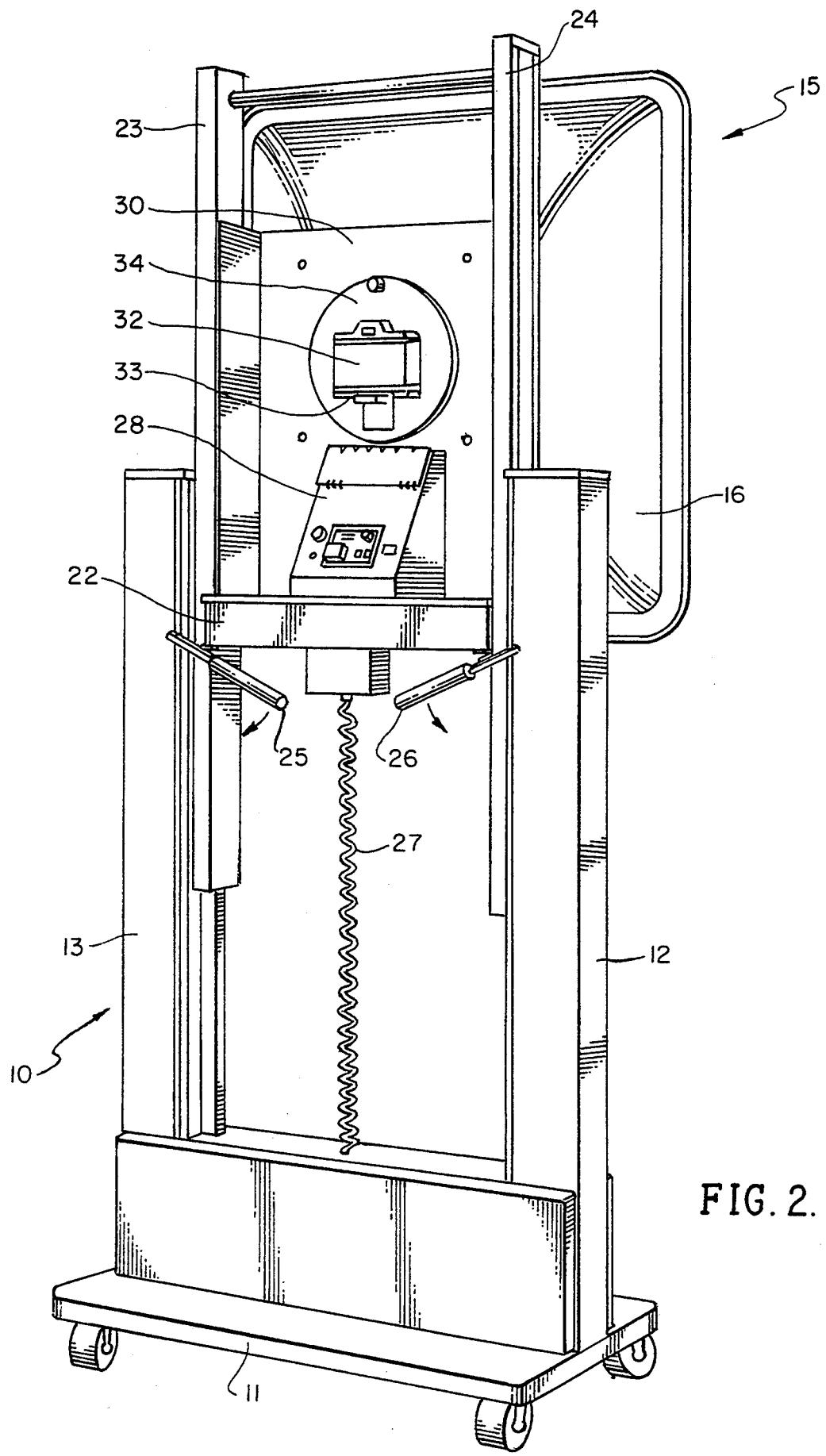
FIG. 2 is a rear perspective view of the apparatus shown in FIG. 1 with the camera assembly raised to its upper position from that shown in FIG. 1.

Referring now in detail to FIG. 2, it can be seen that the camera and lighting assembly 15 is mounted on a carriage 22 having its opposite ends secured to rails 23 and 24 which ride on the associated tracks carried by the stanchions 12 and 13 respectively. In FIG. 1, the camera and lighting assembly is shown in its lower position on the stanchions while in FIG. 2, the assembly has been raised and is held in position in the raised position by means of manually operated stops 25 and 26. Power for the lighting and other accessories is provided by an extendable cord 27 leading to a control box 28 incorporating a plurality of buttons, lights and other control and operating switches. A fixed light panel 30 is mounted on the carriage 22 so as to move vertically therewith and the reflector shield 16 is directly carried thereon by means of block 31 shown in FIG. 3. A camera of a precision type is indicated by numeral 32 and is illustrated as being carried on a bracket 33 which may be adjustable in a vertical direction. The camera and its bracket is carried on the backside of a rotating camera mount 34 so that the zoom lens 20 projects through a barrel or sleeve 35 mounted on roller bearings 29.

Figure 3:
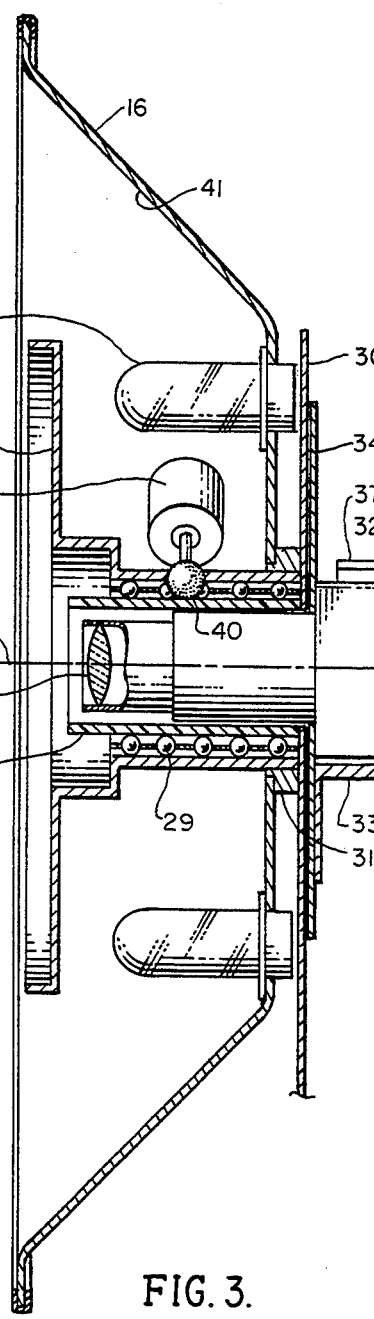
FIG. 3 is a transverse cross-sectional view of the apparatus shown in FIG. 1 as taken in the direction of arrows 3—3 thereof.

Referring now in detail to FIG. 3, it can be seen that the zoom lens 20, the sleeve 35 and the lens hood 17 are all coaxially disposed with respect to an optical axis indicated by numeral 36. Camera shutter operation may be by a button switch 37 and the zoom operation of the lens is under motor control via motor 38 and frictional drive mechanism 40. It is important to notice that the lens hood 17 and the reflector shield 16 are arranged in fixed spaced-apart relationship and are carried respectively on the light panel 30. A space or cavity is defined between the opposing surfaces of the lens hood and the light shield in which the set of strobe lights 21 are disposed as well as the drive motor 38. Therefore, the indirect lighting is initiated from the strobe lights 21 which is directed in part against the back of the lens hood 16 and then reflected against the angular surface, such as indicated by numeral 41 of the reflector shield for distribution forwardly of the apparatus.

Therefore, it can be seen that a considerable variety of selective control is given to the operator of the apparatus. For example, motor 38 may be operated to properly adjust for reproduction ratio via the zoom lens 20 while orientation of the camera 32 may be effected by rotating the camera mount 34. Height adjustment of the camera is achieved by moving the carriage 22 vertically either up or down and proper lighting is always available since the camera and lighting devices are combined on the movable assembly 15. The comparative photographic apparatus establishes a controlled and repeatable photographic environment which is movable, and includes improved lighting, means for selective image sizing, means of subject posing orientation and ease of use. Also, it can be seen that the mobile platform 11 may be moved over the floor surface for non-commitment of dedicated, valuable space and for storage when not in use.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A photographic recordation apparatus comprising the combination of:

a mobile platform;

an upright support carried on said mobile platform;

a combined lighting and camera assembly movably carried on said upright support;

said lighting and camera assembly having a fixed panel 34;

a camera with a zoom lens movably supported on said fixed panel;

a light reflector disposed on said fixed panel about said camera zoom lens;

a light shield carried on said fixed panel in fixed spaced-apart relationship with respect to said reflector;

light means carried on said light reflector behind said light shield; and motor means disposed between said light shield and said reflector in driving relationship with said camera zoom lens for moving said camera zoom lens along an optical axis.

2. The invention as defined in claim 1 wherein:

said light means is a set of at least two strobe lights arranged in spaced relationship with respect to each other about said camera zoom lens.

3. The invention as defined in claim 2 including:

a mounting sleeve secured to said camera zoom lens; and said light shield and said reflector being mounted about said sleeve with said motor means in selective engagement with said camera zoom lens.

4. The invention as defined in claim 3 including:

a rotational panel movably carried on said fixed panel mounting said camera for rotational movement on said fixed panel about said optical axis.

5. The invention as defined in claim 4 including:

a frictional drive means operably disposed between said motor means and said camera zoom lens.

6. The invention as defined in claim 5 wherein:

said camera zoom lens and said camera having an optical axis; and said light reflector, said light shield and said sleeve are coaxially disposed with respect to said optical axis of said camera zoom lens and said camera.

7. A photographic recordation apparatus comprising:

a mobile platform;

a lighting and camera assembly carried on said platform;

said assembly having a fixed panel;

a camera rotatably mounted on said fixed panel and having a zoom lens outwardly projecting from said fixed panel;

an elongated sleeve coaxially carried on said camera zoom lens; and powered drive means disposed on said fixed panel and operably coupled to said zoom lens via said sleeve for advancing and retracting said zoom lens.

8. The invention as defined in claim 7 wherein:
said lighting and camera assembly includes a reflector and a light shield carried on said fixed panel in fixed spaced-apart relationship; and
a strobe lighting arrangement mounted on said reflector between said reflector and said light shield.

9. The invention as defined in claim 8 including:
carriage means mounting said lighting and camera assembly on said mobile platform for movement towards and away from said mobile platform.

* * * * *